United States Patent
Chabaud

(10) Patent No.: US 12,124,885 B2
(45) Date of Patent: Oct. 22, 2024

(54) HIGH PERFORMANCE COMPUTING MACHINE AND METHOD IMPLEMENTED IN SUCH A HPC MACHINE

(71) Applicant: BULL SAS, Les Clayes-sous-bois (FR)

(72) Inventor: Florent Chabaud, Paris (FR)

(73) Assignees: BULL SAS, Les Clayes-sous-Bois (FR); LE COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 84 days.

(21) Appl. No.: 17/901,798

(22) Filed: Sep. 1, 2022

(65) Prior Publication Data
US 2023/0076890 A1 Mar. 9, 2023

(51) Int. Cl.
G06F 9/50 (2006.01)
G06F 21/31 (2013.01)
G06F 21/53 (2013.01)
G06F 21/60 (2013.01)
G06F 21/79 (2013.01)

(52) U.S. Cl.
CPC ........... *G06F 9/5072* (2013.01); *G06F 21/31* (2013.01); *G06F 21/53* (2013.01); *G06F 21/602* (2013.01); *G06F 21/79* (2013.01); *G06F 2221/2143* (2013.01)

(58) Field of Classification Search
CPC ....... G06F 9/5072; G06F 21/31; G06F 21/53; G06F 21/602; G06F 21/79; G06F 2221/2143; G06F 21/57; G06F 21/44; H04L 63/0428; H04L 63/0807
See application file for complete search history.

(56) References Cited

U.S. PATENT DOCUMENTS

| | | | |
|---|---|---|---|
| 2016/0182484 A1 | 6/2016 | Shih | |
| 2017/0075699 A1* | 3/2017 | Narayanan | H04L 9/006 |
| 2020/0162271 A1* | 5/2020 | Cambou | H04L 63/0435 |
| 2022/0214917 A1* | 7/2022 | Chien | G06F 9/45558 |
| 2023/0004661 A1* | 1/2023 | Choi | G06F 21/602 |
| 2023/0006981 A1* | 1/2023 | Syrivelis | H04L 9/0852 |

FOREIGN PATENT DOCUMENTS

WO 2020145944 A1 7/2020

OTHER PUBLICATIONS

European Search Report issued in EP21306218, dated Jan. 31, 2022 (7 pages).

* cited by examiner

*Primary Examiner* — Michael A Keller
(74) *Attorney, Agent, or Firm* — ARC IP Law, PC; Joseph J. Mayo

(57) ABSTRACT

A High Performance Computing (HPC) machine comprising several computing processors interconnected through at least one network, and at least one primary management unit, in a vicinity of at least one computing processor. The at least one primary management unit powers on the at least one processor. The at least one primary management unit (comprises a random data item generator, and a secure storage memory for storing a secret data item, common to all computing processors of the HPC machine, and used for authentication of each computing processor of the HPC machine for data exchange in the HPC machine.

16 Claims, 3 Drawing Sheets

HIGH PERFORMANCE COMPUTING MACHINE AND METHOD IMPLEMENTED IN SUCH A HPC MACHINE

This application claims priority to European Patent Application Number 21306218.5, filed 6 Sep. 2021, the specification of which is hereby incorporated herein by reference.

BACKGROUND OF THE INVENTION

Field of the Invention

Embodiments of the invention relate to a high performance computing (HPC) machine. The invention further relates to a method implemented in such a HPC machine.

The field of the invention is the field of high performance computing machines.

Description of the Related Art

The general purpose of High Performance Computing is to perform computations as fast as possible. To attain maximum computing speed, the data exchange between computing nodes must be as fast as possible, and the computing power of each node must be fully dedicated to the computing.

HPC machines are constituted of thousands of computing nodes exchanging information internally to perform the computations they have been programmed for. Given their cost, these machines are rarely stopped, and hot maintenance is key to their performance, i.e. the ability to hot-swap parts of the machine during their use. However, from a security perspective, this feature introduces a threat since it allows to introduce hardware and data which could harm the machine if they embed a malware.

To mitigate the risk of a malevolent connection, the usual approach is to introduce access controls and network encryption: user access control protocols (such as Kerberos) to link a personal computer to its end-user and allow the connection, and/or network access control to ensure a hardware authentication at network level to isolate unrecognized hardware at this level.

Thus, known security approaches for HPC machines heavily rely on a centralized trusted third party that must be contacted regularly during the connection to maintain the security of the HPC machine. This implies delays in computation which are hardly compatible with the efficiency purpose of a HPC machine.

A purpose of one or more embodiments of the invention is to overcome at least one of these drawbacks.

Another purpose of one or more embodiments of the invention is to propose a solution reducing the delays in secure communication in a HPC machine, thus rendering the HPC machine more efficient, while conserving the security of said HPC machine.

BRIEF SUMMARY OF THE INVENTION

One or more embodiments of the invention makes it possible to achieve at least one of these aims by a High Performance Computing, HPC, machine comprising:
- several computing processors interconnected through at least one network, and
- at least one primary management unit, in the vicinity of at least one computing processor, and provided for powering on said at least one processor, directly or indirectly;

wherein at least one primary management unit comprises:
- a random data item generator,
- a secure storage memory, for storing a secret data item, common to all computing processors of said HPC machine, and used for authentication of each computing processor of said HPC machine for data exchange, and in particular secure and encrypted data exchange, in said HPC machine.

Thus, at least one embodiment of the invention proposes a HPC machine in which the authentication of the computing processors (CP) for data exchange is realised thanks to a secret data item that is commonly known to all CP of the HPC machine. Thus, the exchange of data in said HPC machine is simplified.

The secret data item is stored in a secure data storage memory. Thus, the security of the HPC machine is preserved and maintained like in the current HPC machines.

Moreover, in at least one embodiment, the common secret data item is stored in the vicinity of each CP so that each CP may access to the secret data without the need to contact a centralized trusted third party. Thus, in the HPC machine of one or more embodiments of the invention, the secure communications are faster and simpler than in the current HPC machines using a trusted, centralized, third party for authentication. Since each CP spends less time and energy for authentication and encryption, each CP has more time and energy for computing, thus increasing the efficiency of the HPC machine.

Furthermore, in the HPC machine of one or more embodiments of the invention, each management unit may generate the secret data locally, i.e. in the vicinity of the CP(s). Thus, the CP doesn't need to contact a centralized trusted third-party event for the generation of the secret data item. The secret data item is disseminated among the primary management units, consequently among the CP of the HPC, as the primary management units are powered on, without the need for a trusted centralized third party.

In at least one embodiment of the invention, "computing processor", or "CP", denotes a processor participating to the computation task of the HPC machine.

In at least one embodiment of the invention, "management processor", or "MP", denotes a processor not participating to the computation tasks in the HPC machine. Such a processor is used in the management unit or hosts the management unit. Such a processor may be, as described later in non-limitative examples, the processor of a Baseboard Management Controller (BMC) of a computing blade (CB), or the processor of a Rack Management Controller (RMC) of a computing rack (CR).

In at least one embodiment of the invention, a management unit is located in the "vicinity" of at least one CP when said management unit is located on the same electronic component as the at least one CP, such as for example:
- in the CP itself, or
- on the same electronic board as the at least one CP, or
- on the same computing blade as the at least one CP, or
- on the same computing rack as the at least one CP, as long as the at least one CP and the said management unit are able to communicate directly through hardware without relying on a network, such as for example:
- through an internal bus, or
- through a SPI (Serial Peripheral Interface) bus, or
- through a PCI (Peripheral Component Interconnect) bus, or
- through direct pin-to-pin connection.

According to one or more embodiments, the secret data item stored by a primary management unit (PMU) may be a data item generated by the random data generator of said PMU, or a data item generated by the random data generator of another PMU similar or identical to said PMU.

Alternatively, in one or more embodiments, the secret data item stored by a PMU may be a data item derived from the random data issued by the random data generator of said PMU, or from a data item generated by the random data generator of another PMU similar or identical to said PMU.

Alternatively, in one or more embodiments, the secret data item stored by a PMU may be a secret data item transmitted by another PMU similar or identical to the PMU.

The HPC machine according to one or more embodiments of the invention, the several computing processors CP may be interconnected with each other through:
- an interconnection network for computational data exchange between the CPs; and/or
- a management network for management data exchange.

The secret data item, common to all computing processors of said HPC machine, may be used for authentication, and optionally for data encryption, for secure communications:
- on said interconnection network, and/or
- on said management network.

The management network and the interconnection network may be different physical networks, such that each network is a different physical LAN (Local Area Network). In one or more embodiments, the said networks may share a same physical network: in this case, the said networks may be different virtual networks, such as vLANs (Virtual Local Area Network) sharing said same physical network.

In one or more embodiments, the common secret data item may be a random number. Thus, the secret data item is a cryptographic data that is more difficult to guess or determine beforehand, for example by malevolent parties.

In one or more embodiments, the random data item generator may comprise a random number generator. The random number generator may be any kind of known random number generator achieving cryptographic quality.

In at least one embodiment, the random number generator may be provided to generate a random number as a function of at least one physical quantity measured by at least one sensor in the HPC machine. Thus the random number achieves cryptographic level because it is dependent of the value of at least one physical parameter at the time the random number is generated.

Such a sensor may be a sensor of the HPC machine, or a sensor located on the same component as the primary management unit, or a sensor of the primary management unit, or a sensor of the random number generator, or a sensor located in a MP of said primary management unit, or in a CP associated with the primary management unit.

Such a sensor may be a temperature sensor, a pressure sensor, a frequency sensor, etc.

In one or more embodiments, the HPC machine may comprise a primary management unit dedicated to a single computing processor.

In at least one embodiment, the primary management unit may be integrated in said computing processor.

In one or more embodiments, the primary management unit may be integrated in a MP coupled to said CP. For instance, such a MP may be an ARM CPU coupled with an Intel CPU CP.

Alternatively, or in addition, the HPC machine according to one or more embodiments of the invention may comprise a primary management unit common to several computing processors.

In at least one embodiment, the primary management unit is not dedicated to a single CP.

In at least one embodiment, the several CP may be organized as a computing blade, or may be part of a computing blade. The computing blade may comprise a BMC comprising at least a MP. The MP of the BMC may be an ARM CPU.

The primary management unit may be integrated in one of the CP among the several CP.

Alternatively, in at least one embodiment, the primary management unit may be integrated in a MP that is not a CP. The MP may be a processor of the BMC.

The primary management unit may also be implemented on a daughter board of the computing blade.

Alternatively, or in addition, the HPC machine according to one or more embodiments of the invention may comprise a primary management unit common to several groups of computing processors, at least one of said groups comprising several computing processors.

In at least one embodiment, the primary management unit is dedicated to several groups of CP.

The several groups of CP may be organized as a computing rack (CR). The CR may comprise a RMC (Rack Management Controller) comprising at least a MP. The MP of the RMC may be an ARM CPU.

At least one, in particular each, group of CP may be organized as a computing blade. The computing blade may comprise a BMC comprising at least an MP. The MP of the BMC may be an ARM CPU.

The primary management unit may be integrated in one of the CP of one of the groups of CP.

Alternatively, in at least one embodiment, the primary management unit may be integrated in a MP that is not a CP. The MP in which the primary management unit is integrated may be a processor of the BMC of one of the groups. Preferably, in at least one embodiment, the MP in which the primary management unit is integrated may be a processor of the RMC.

At least one embodiment of the invention is best suited for the current architectures of the HPC machines.

When the HPC machine according to one or more embodiments of the invention comprises several groups of CP, as described above, said machine may further comprise, at least for one of the groups, a secondary management unit:
- located in the vicinity of said group, and
- provided for powering on at least one processor of said group;

wherein said secondary management unit also comprises a secure storage memory for storing the common secret data item.

The common secret data item may be communicated to the secondary management unit, optionally but preferably, after the identity of the secondary unit is verified.

As described above, in at least one embodiment, the group of CP may be organized as a computing blade. In at least one embodiment, the computing blade may also comprise a BMC comprising at least a MP. The MP of the BMC may be for example an ARM CPU.

The primary management unit may be integrated in one of the CP of the group, or more preferably in the BMC, and even more preferably in the MP of the BMC.

In one or more embodiments, for at least one, in particular each, primary management unit the secure storage memory may be a RAM memory that is erased when said primary management unit is powered off.

Thus, in at least one embodiment, when a component of the HPC machine comprising the primary management unit is removed, for example for maintenance or replacement, the secret data is not conserved in the removed component.

Indeed, when a component is removed, this component is first powered off. The power off results in the obliteration of the RAM memory, avoiding a third party to access to the secret data item by examining the removed component of the HPC machine.

In one or more embodiments, for at least one, in particular each, secondary management unit the secure storage memory may be a RAM memory that is erased when said secondary management unit is powered off.

Thus, in at least one embodiment, when a component of the HPC machine comprising the secondary management unit is removed, for example for maintenance or replacement, the secret data is not conserved in the removed component. Indeed, when a component is removed, this component is first powered off. The power off results in the obliteration of the RAM memory, avoiding a third party to access to the secret data item by examining a removed component of the HPC machine.

In one or more embodiments, at least one, in particular each, primary management unit may comprise a trusted execution environment, TEE, for executing a trusted client controlling access to the secure storage memory of said management unit.

Thus, in at least one embodiment, access to the secret data is controlled and protected because the TEE guarantees the client loaded inside to be protected with respect to confidentiality and integrity. The TEE may be a secure area of a CP when the primary management unit is integrated in a CP, or of a MP when the primary management unit is integrated in a MP.

For example, in at least one embodiment, an ARM CPU provides a built-in TEE, known as ARM TrustZone. An Intel CPU also provides a built-in TEE, known as Intel TXT or SGX. Thus, for example, the primary management unit may be integrated in such a CPU, that may be a CP or a MP.

At least one, in particular each, secondary management unit may also comprise a trusted execution environment, TEE, for executing a trusted client controlling access to the secure storage memory of said secondary management unit; according to one or more embodiments.

The TEE of the secondary management unit may be similar or identical to the TEE of the primary management unit described above. All the features descried above with reference to the TEE of the primary management unit may apply to the TEE of the secondary management unit.

According to one or more embodiments, at least one, in particular each, primary management unit may further comprise a one-time programmable, OTP, memory for storing an identity data item, for checking and attesting the identity of a component comprising said management unit, in particular at the time said component is added to said machine.

For example, in at least one embodiment, when the primary management unit is arranged in a RMC of a CR, the OTP memory of the primary management unit may comprise an identity data for attesting the identity of the RMC, or the CR, and making sure that the RMC, or the CR, is not a malevolent component.

Similarly, at least one, in particular each, secondary management unit, as the case may be, may further comprise a one-time programmable, OTP, memory for storing an identity data item, for checking and attesting the identity of a component comprising said management unit, in particular at the time said component is added to said machine.

For example, in at least one embodiment, when the secondary management unit is arranged in a BMC of a CB, the OTP memory of the secondary management unit may comprise an identity data for attesting the identity of the BMC, or the CB, and making sure that the BMC, or the CB, is not a malevolent component.

Indeed, before delivering the secret to a new component of the HPC machine, it is important to determine if the new component is sane. The OTP memory with the identity data makes it possible to check the identity of such a new component.

In one or more embodiments, the identity data may be a public key, injected in the OTP memory at factory level, and whose private corresponding part is owned by the vendor or the supplier. This key pair may be used to attest, remotely, the authenticity of the new component, by using TPM-like standards. This way, in at least one embodiment, a newly inserted component can be checked remotely for sanity before providing the secret data to said component.

According to a non-limitative example, the HPC machine according to one or more embodiments of the invention may comprise several computing racks, each computing rack comprising several computing blades, each computing blade comprising several computing processors, wherein:

for at least one computing rack: a primary management unit is integrated in a Rack Management Controller, RMC, of said computing rack, in particular in a processor of said RMC; and for at least one computing blade: a secondary management unit is integrated in a Baseboard Management Controller, BMC, of said computing blade, in particular in a processor of said BMC.

Of course this example of architecture of the HPC machine according to one or more embodiments of the invention is in no way limitative, even if this architecture best corresponds to current architectures of the HPC machines. Indeed, in at least one embodiment, the most common architecture of the current HPC machine comprise several CR, each CR comprising a RMC and several CB, each CB comprising a BMC and several blades. Thus at least one embodiment of the invention may be implemented in existing HPC machines without changing the architecture of said existing HPC machines, and without use of additional components. This makes one or more embodiments of the invention very cost effective for implementing in existing HPC machines.

According to at least one embodiment of the invention, it is proposed a management method for a HPC machine according to the invention, said method comprising a phase for powering on said HPC machine, said powering on phase comprising the following steps:

powering on a first primary management unit, generating, by said primary management unit, a secret data item, and storing said secret data item in the secure storage memory.

The first primary management unit is the first one of all primary management units of the HPC machine to be powered on. This means that no secret data item is generated yet in the HPC machine. The secret data item generator of the first primary management unit is used to generate the first secret data item in the HPC machine.

The first primary management unit may be powered on by powering on the component comprising said first primary management unit, as for example a RMC of a CR, or a BMC of CB, etc.

The first secret data item generated may be used as the common secret data item for all the CP of the HPC machine. In this case, by way of at least one embodiment, this first secret data item is transmitted to every primary management unit powered-on after the first primary management unit, optionally after verification of the identity of the component integrating said primary management unit, for example as described above. When applicable, the common secret data item may be shared with every secondary management unit powered on afterwards, optionally after verification of the identity of the component comprising said secondary management unit, for example as described above.

When several primary management units are powered-on at the same time, the powering on phase may comprise:
  generating, by each said primary management unit, a secret data item,
  negotiating between said primary management units of a common secret data item, according to a predetermined negotiation protocol, and
  storing said common secret data item in the secure storage memory of each of said primary management units.

The negotiating protocol may lead to choosing one of the generated secret data items, as the common secret data item, for example by using a predetermined agreement protocol.

Alternately, in one or more embodiments, the negotiating protocol may lead to calculate the common secret data item as a function of the generated secret data items.

Regardless the negotiating solution, in at least one embodiment, the common secret data item obtained at the negotiating step may optionally be stored in a first block of a blockchain, optionally with a timestamp. The secret data item generated by each of the primary management unit may also be added as new block in said blockchain.

When a new component comprising a primary management unit is powered on, or added to the HPC machine, said primary management unit may generate a secret data item also added to the blockchain in a new block, optionally along with a timestamp.

At least one embodiment of the invention includes a communication method in a HPC machine, said communication method step comprising at least one step of sending data to, or receiving data from, at least one computing processor according to a key agreement protocol using the common secret data stored in the secure storage memory of the primary management unit associated to said computing processor.

In the key agreement protocol, in one or more embodiments, the common secret data may be used as the key agreed with said CPs. Alternatively, in at least one embodiment, the key may be generated as a function of said common secret data, by a generator known by each CP, or primary management unit.

BRIEF DESCRIPTION OF THE DRAWINGS

Other advantages and characteristics will become apparent on examination of the detailed description of at least one embodiment which is in no way limitative, and the attached figures, where.

DETAILED DESCRIPTION OF THE INVENTION

It is well understood that the one or more embodiments that will be described below are in no way limitative. In particular, it is possible to imagine variants of the invention comprising only a selection of the characteristics described hereinafter, in isolation from the other characteristics described, if this selection of characteristics is sufficient to confer a technical advantage or to differentiate the invention with respect to the state of the prior art. Such a selection comprises at least one, preferably functional, characteristic without structural details, or with only a part of the structural details if this part alone is sufficient to confer a technical advantage or to differentiate the one or more embodiments of the invention with respect to the prior art.

In the FIGURES, elements common to several figures retain the same reference.

Figure 1:
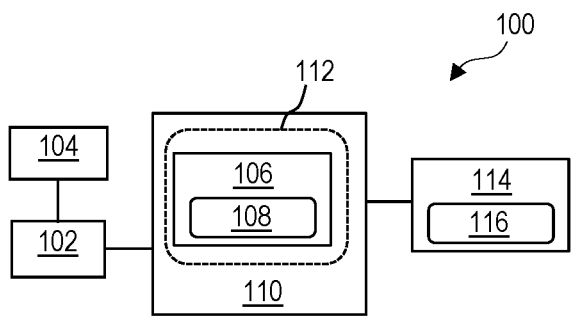
FIG. 1 is a diagrammatic representation of a non-limitative example of a primary management unit according to one or more embodiments of the invention.

FIG. 1 is a diagrammatic representation of a non-limitative example of a primary management unit that may be implemented in a HPC machine according to one or more embodiments of the invention.

The primary management unit 100, shown in FIG. 1, is provided to be positioned in close proximity, or in the vicinity, of at least one computing processor (CP), not represented in FIG. 1. For example, in at least one embodiment, the management unit 100 may be implemented in a CP, or in/on the same component as the at least one CP, such as on/in the same:
  electronic board as the at least one CP, or
  computing blade as the at least one CP, or
  computing rack as the at least one CP;
as long as the at least one CP and the said management unit are able to communicate directly through hardware without relying on a network, such as for example:
  through an internal bus, or
  through a SPI (Serial Peripheral Interface) bus, or
  through a PCI (Peripheral Component Interconnect) bus, or
  through direct pin-to-pin connection.

Thus, the primary management unit 100 is readily and locally accessible by each CP, without contacting a centralized third party.

The primary management unit 100, shown in FIG. 1, is provided for powering on said at least one CP associated with said primary management unit. The primary management unit may carry out other functions for the at least one CP, such as a communication interface, cooling management, data encryption/decryption, etc.

The primary management unit, PMU, 100 comprises a random data item generator 102. The random data generator 102 may be any device or any function that generates a random data that is different every time. For example, the random data generator 102 may enclose a hash function or similar. The random data generator 102 may be a random number generator.

Preferably, in at least one embodiment, the random data generator 102 may generate a random data as a function of at least one physical quantity measured by at least one physical sensor 104, such as a temperature sensor, a frequency sensor, a noise sensor, etc. Thus, in at least one embodiment, the random data generated by the random data generator 102 depends on the value of the at least one physical quantity measured, by the at least one sensor, at the time said random data item is generated, in the environment of the PMU.

The PMU 100, shown in FIG. 1, also comprises a secure storage memory 106, for storing a secret data item 108, for example a secret data derived from the random data issued by the random data generator 102 of the PMU 100, or a secret data item transmitted by another PMU similar or identical to the PMU 100.

The secret data item 108 stored in the secure storage memory 106 is used by each CP managed, directly or indirectly, by the PMU 100 for authentication in the HPC machine, for example for data exchange in said HPC machine.

The secure data storage memory 106 may be any type of memory, as long as the content of such memory is protected such that access to said memory is regulated. The security of the memory 106 may comprise hardware security means and/or software security means.

Preferably, in at least one embodiment, the secure data memory 106 may be a memory that is, partially or totally, erased when said memory is powered off. For example, in at least one embodiment, the secure data memory may be a RAM memory such that the power-off of the PMU, or of the component comprising said PMU, results in the obliteration of the RAM memory, avoiding a third party to access to the secret data item.

Preferably, in one or more embodiments, the PMU 100 may also comprise a trusted execution environment, TEE, 110 for executing a trusted client 112 controlling access to the secure storage memory 106. Thus, in at least one embodiment, the access to the secret data item 108 is controlled by a client 112. The TEE 110 guarantees, thanks to the client 112, that the secret data item 108, stored in the secure storage memory 106, is protected with respect to confidentiality and integrity. The TEE 110 may be a secure area of a processor.

For example, in at least one embodiment, an ARM CPU provides a built-in TEE, known as ARM TrustZone. An Intel CPU also provides a built in TEE, known as Intel SGX. Thus, for example, the primary management unit may be integrated in an ARM CPU that may be a computing processor, or preferably a management processor.

For a component, access to the secure storage memory 106 may be authorized by the trusted client 112 only if the component provides a valid and confirmed identity data, proving that said component is a component of the HPC machine or a trusted component. For example, in at least one embodiment, for another PMU or a secondary management unit (as will be described below), access to the secure storage memory 106 may be authorized by the trusted client 112 only if said management unit provides a valid and confirmed identity data, proving that said management unit, or the component comprising said management unit, is a trusted component.

The primary management unit 100 may preferably further comprise a one-time programmable, OTP, memory 114 for storing an identity data item 116. This identity data item is used for checking and attesting the identity of said PMU 100, or of a component comprising said PMU, in particular at the time said component is added to the HPC machine, or powered on. For example, in at least one embodiment, when the PMU is arranged in/on a rack management controller, the OTP memory of the PMU may comprise an identity data for attesting the identity of said rack management controller.

The identity data 116 may be a public key, injected in the OTP memory 114 at factory level, and whose private corresponding part is owned by the vendor or the supplier. This key pair may be used to attest, remotely, the authenticity of the new component, by using TPM-like standards. This way, a newly inserted/powered on component can be checked remotely for sanity before sharing the common secret data item with said component.

Of course, by way of one or more embodiments, the PMU 100 may comprise other component(s) or software(s), that will not be described here since those components are not relevant for the understanding of the one or more embodiments of the invention. For example, in at least one embodiment, the PMU 100 may comprise a central unit, or a central software, for managing the PMU, or for communicating with other components, for data encryption/decryption, etc.

Figure 2:
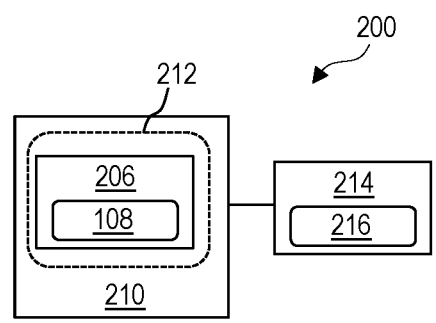
FIG. 2 is a diagrammatic representation of a non-limitative example of secondary management unit according to one or more embodiments of the invention.

FIG. 2 is a diagrammatic representation of a non-limitative example of a secondary management unit that may be implemented in a HPC machine according to one or more embodiments of the invention.

The secondary management unit, SMU, 200, shown in FIG. 2, is provided to be positioned in close proximity, or in the vicinity, of at least one computing processor (CP). For example, the SMU 200 may be implemented in a CP, or in/on the same component as the at least one CP, such as on/in the same:
  electronic board as the at least one CP, or
  computing blade as the at least one CP.
Thus, the SMU 100 is readily and locally accessible by each CP, without using a centralized third party.

The SMU 200, shown in FIG. 2, is provided for powering on said at least one CP associated with said SMU 200. The SMU may carry out other functions for the at least one CP, such as a communication interface for the CP, managing of the cooling of the CP, data encryption/decryption for said CP, etc.

The SMU 200 comprises a secure storage memory 206, similar to the secure data storage 106 of the PMU 100 of FIG. 1. The secure data storage memory 206 is used for storing a secret data item 108, for example a secret data generated by the secret data generator 102 of the PMU 100, or a secret data item transmitted by another PMU similar or identical to the PMU 100.

The secure data storage memory 206 may be any type of memory, as long as the content of such memory is protected such that access to said memory is regulated. The security of the memory 206 may comprise hardware security means and/or software security means.

Preferably, in one or more embodiments, the secure data memory 206 may be a memory that is, partially or totally, erased when said memory is powered off. For example, in at least one embodiment, the secure data memory 206 may be a RAM memory such that the power-off of the SMU 200, or of the component comprising said SMU 200, results in the obliteration of the RAM memory, avoiding a third party to access the secret data item 108.

Preferably, in one or more embodiments, the SMU 200 may also comprise a TEE 210 for executing a trusted client 212 controlling access to the secure storage memory 206, similar to the PMU 100. Thus, in at least one embodiment, the access to the secret data item 108 is controlled by a client 212. The TEE 210 guarantees, thanks to the client 212, that the secret data item 108, stored in the secure storage memory 206, is protected with respect to confidentiality and integrity. The TEE 210 may be a secure area of a processor.

For example, in one or more embodiments, an ARM CPU provides a built in TEE, known as ARM TrustZone. An Intel CPU also provides a built in TEE, known as Intel SGX. Thus, for example, the SMU may be integrated in an ARM CPU that may be a computing processor, or preferably a management processor.

Similar to the PMU 100, in one or more embodiments, the SMU 200 may preferably further comprise a one-time programmable, OTP, memory 214 for storing an identity data item 216. This identity data item 216 is used for checking and attesting the identity of said SMU 200, or of a component comprising said SMU 200, in particular at the time said component is added to the HPC machine, or powered on. For example, when the PMU is arranged in/on a baseboard management controller of a computing blade, the OTP memory 214 of the SMU 200 may comprise an identity data 216 for attesting the identity of said baseboard management controller, or the identity of said computing blade.

The identity data 216 may be a public key, injected in the OTP memory 214 at factory level, and whose private corresponding part is owned by the vendor or the supplier. This key pair may be used to attest, remotely, the authenticity of the new component, by using TPM-like standards. This way, a newly inserted/powered on component can be checked remotely for sanity before sharing the common secret data item with said component.

Of course, by way of one or more embodiments, the SMU 100 may comprise other component(s) of software(s), that will not be described here since those components are not relevant in the understanding of the one or more embodiments of the invention. For example, in one or more embodiments, the SMU 200 may comprise a central unit, or a central software, for managing the SMU, or for communicating with other components, for data encryption/decryption, etc.

Figure 3:
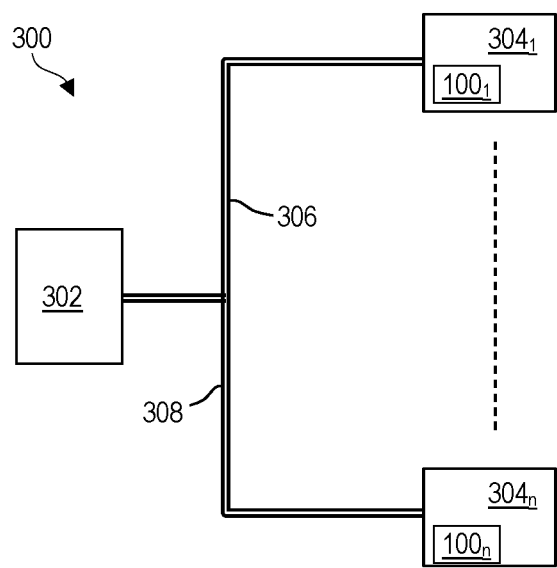
FIGS. 3-5 are diagrammatic representations of non-limitative examples of a HPC machine according to one or more embodiments of the invention.

FIG. 3 is a diagrammatic representation of a non-limitative example of a HPC machine according to one or more embodiments of the invention.

The HPC machine 300, shown in FIG. 3, is used to for any type of high-performance computing for example in the domain of finance, weather, biology, etc.

The HPC machine 300 comprises a central device 302 that coordinates and manages the computations in the HPC machine 300. The central device may be a server, a computer, a CPU, etc.

The HPC machine 300 also comprises several computing processors $304_1$-$304_n$, for performing an overall computing task. Each computing processor (CP) may compute individual computing task, in parallel or in series with at least another CP, depending on the overall computing task.

The CPs $304_1$-$304_n$ are interconnected with each other and with the central device 302, through:
- an interconnection network 306 for computational data exchange between the CPs or with the central device 302,
- a management network 308 for management data exchange, especially with the central device.

The networks 306 and 308 may be different physical networks, such as each network is a different physical LAN (Local Area Network). In some embodiments, the networks 306 and 308 may share a same physical network: in this case, networks 306 and 308 may be different virtual networks, such as vLANs (Virtual Local Area Network) sharing said same physical network.

Each CP $304_1$-$304_n$ comprises a primary management unit $100_1$-$100_n$ according to one or more embodiments of the invention. For example, primary management unit $100_1$-$100_n$ may be the PMU 100 of the FIG. 1. In other words, in the example shown in FIG. 1, each CP $304_i$ comprises an integrated PMU $100_i$.

For example, each CP $304_i$ may be an ARM CPU comprising built in TEE and OTP for the PMU $100_i$.

In this example, the secret data item common to all CP $304_1$-$304_n$ is generated at the level of the CPs $304_1$-$304_n$.

Figure 4:
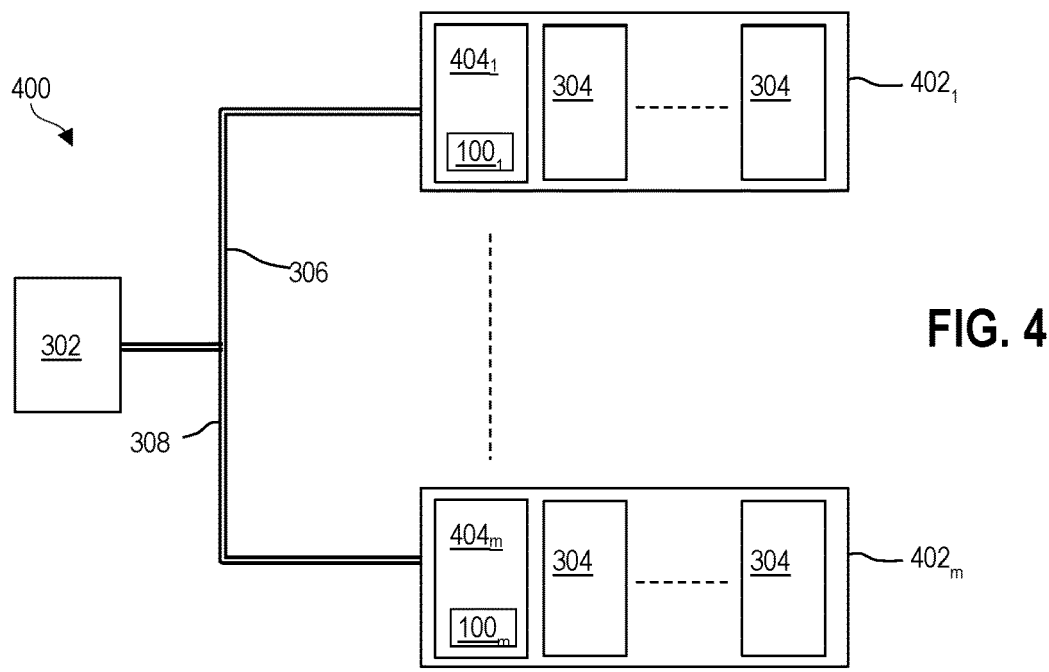

FIG. 4 is a diagrammatic representation of another non-limitative example of a HPC machine according to one or more embodiments of the invention.

The HPC machine 400, shown in FIG. 4, comprises the central device 302 and several CPs, each designated by the reference numeral 304.

In the HPC machine the CPs 304 are organized as groups $402_1$-$402_m$. Each group $402_j$ of CP(s) may comprise one or several CPs 304. At least two groups may comprise the same number of CPs 304. Alternatively, the number of CP in at least two groups may be different.

Each group $402_1$-$402_m$ may be a computing blade also comprising a Baseboard Management controller (BMC), respectively $404_1$-$404_m$.

Each BMC $404_j$ of a computing blade $402_j$ is provided to power on the CPs of the said computing blade, for example individually. Each BMC $404_j$ of a computing blade $402_j$ may also provide other function to the CPs of said computing blade $402_j$, such as a communication interface or a communication gateway, cooling, data encryption, etc.

Each BMC $404_j$ comprises a processor (not shown) that is not a computing processor and that is not used for computing task in the HPC machine 400, contrary to the CPs 304. The processor of the BMC $404_j$ may be called Managing Processor (MP) of the BMC. The MP of at least one BMC $404_1$-$404_m$ may be and ARM CPU.

In the example shown in FIG. 4, the CPs 304 do not comprise a PMU, unlike the CPs of the HPC machine 300 of FIG. 3.

In the HPC 400 of FIG. 4, each BMC $404_1$-$404_m$ comprises a PMU $100_1$-$100_m$, integrated in the processor of said BMC $404_1$-$404_m$.

In this example, the secret data item common to all CPs 304 is generated at the level of the BMCs and not at the level of the CPs. Each CP gets the secret data item from the BMC associated to said CP.

Figure 5:
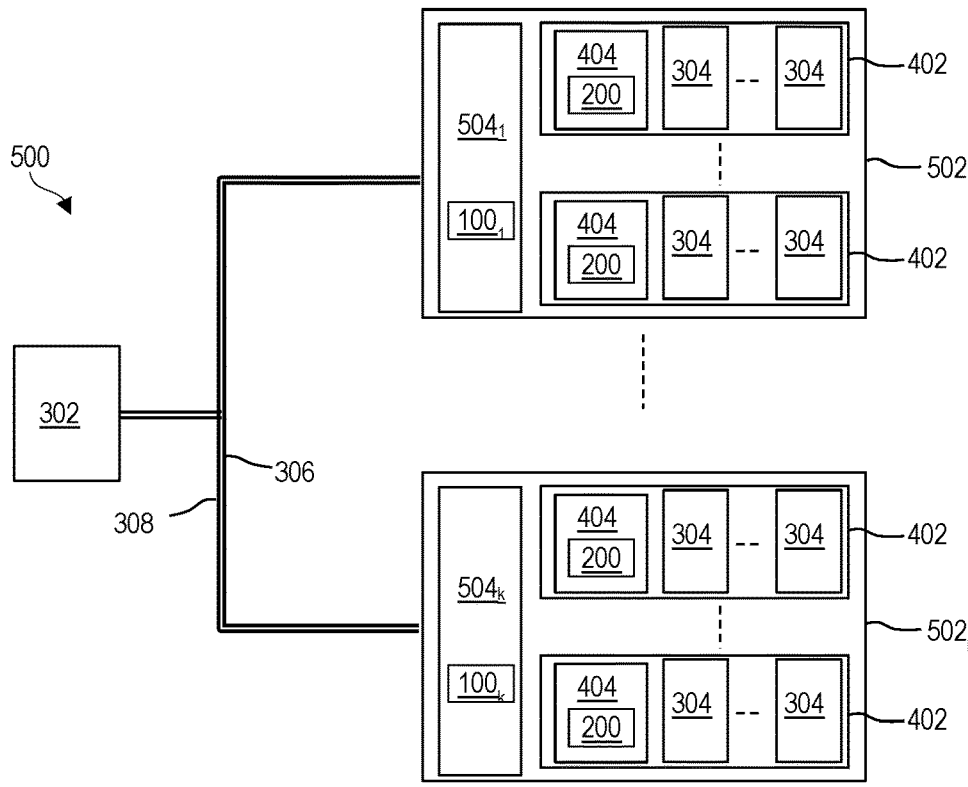

FIG. 5 is a diagrammatic representation of another non-limitative example of a HPC machine according to one or more embodiments of the invention.

The HPC machine 500, shown in FIG. 5, comprises the central device 302 and several CPs, each designated by the reference numeral 304. In the HPC machine the CPs 304 are gathered in groups 402, or computing blades 402.

Furthermore, by way of at least one embodiment, in the HPC machine 500 of FIG. 5, the computing blades 402 are gathered in several groups $502_1$-$502_k$, also called computing racks $502_1$-$502_k$. Each computing rack $502_1$ may comprise one or several computing blades 402. At least two computing rack may comprise the same number of computing blades 402. Alternatively, in at least one embodiment, the number of computing blades 402 in at least two computing rack may be different.

Each computing rack $502_1$ also comprise a Rack Management controller (RMC), respectively $504_1$-$504_m$. Each RMC $504_1$ of a computing rack $502_1$ is provided to power-on each computing blade 402 of said rack $502_1$, for example individually. More particularly, each RMC $504_1$ of a computing rack $502_1$ is provided to power on the BMC 404 of each computing blade 402 of said rack $502_1$, for example individually. Each RMC $504_1$ of a computing rack $502_1$ may also provide other function to the computing blade 402 of said computing rack $502_1$, such as a communication gateway, cooling, data encryption, etc.

Each RMC $504_1$ comprises a processor (not shown) that is not a computing processor and that is not used for computing tasks in the HPC machine 500, contrary to the CPs 304. The processor of the RMC $504_1$ may be called Managing Processor (MP) of the RMC. The MP of at least one RMC $504_1$ may be and ARM CPU.

In the HPC machine 500, each RMC $504_1$-$504_k$ is provided with a primary management unit, respectively $100_1$-$100_k$. The primary management unit $100_1$ of a RMC $504_1$ may preferably, with no loss of generality, be integrated in the processor of said RMC.

Moreover, in the HPC machine 500, each BMC 404 is provided with a secondary management unit, respectively $200_1$-$200_k$. The secondary management unit 200 of a BMC may preferably, with no loss of generality, be integrated in the processor of said RMC. The secondary management unit 200 of a BMC may be the secondary management unit 200 of FIG. 2 for example, by way of one or more embodiments.

In this example, in at least one embodiment, the secret data item common to all CPs 304 is generated at the level of the RMCs $504_1$-$504_i$, and not at the level of the CPs 304 or BMCs 404. The secret data item is communicated to each BMC 404 and stored in the secure storage memory of said BMC, at the time the BMC is powered on. When a CP is powered on the secret data item is subsequently communicated to the CP from the BMC associated to said CP.

Of course, the HPC machine according to one or more embodiments of the invention is not limited to the examples shown in FIGS. 3-5. For example, a HPC machine according to one or more embodiments of the invention may present an architecture corresponding to a combination of at least two of the examples shown in FIGS. 3-5.

Figure 6:
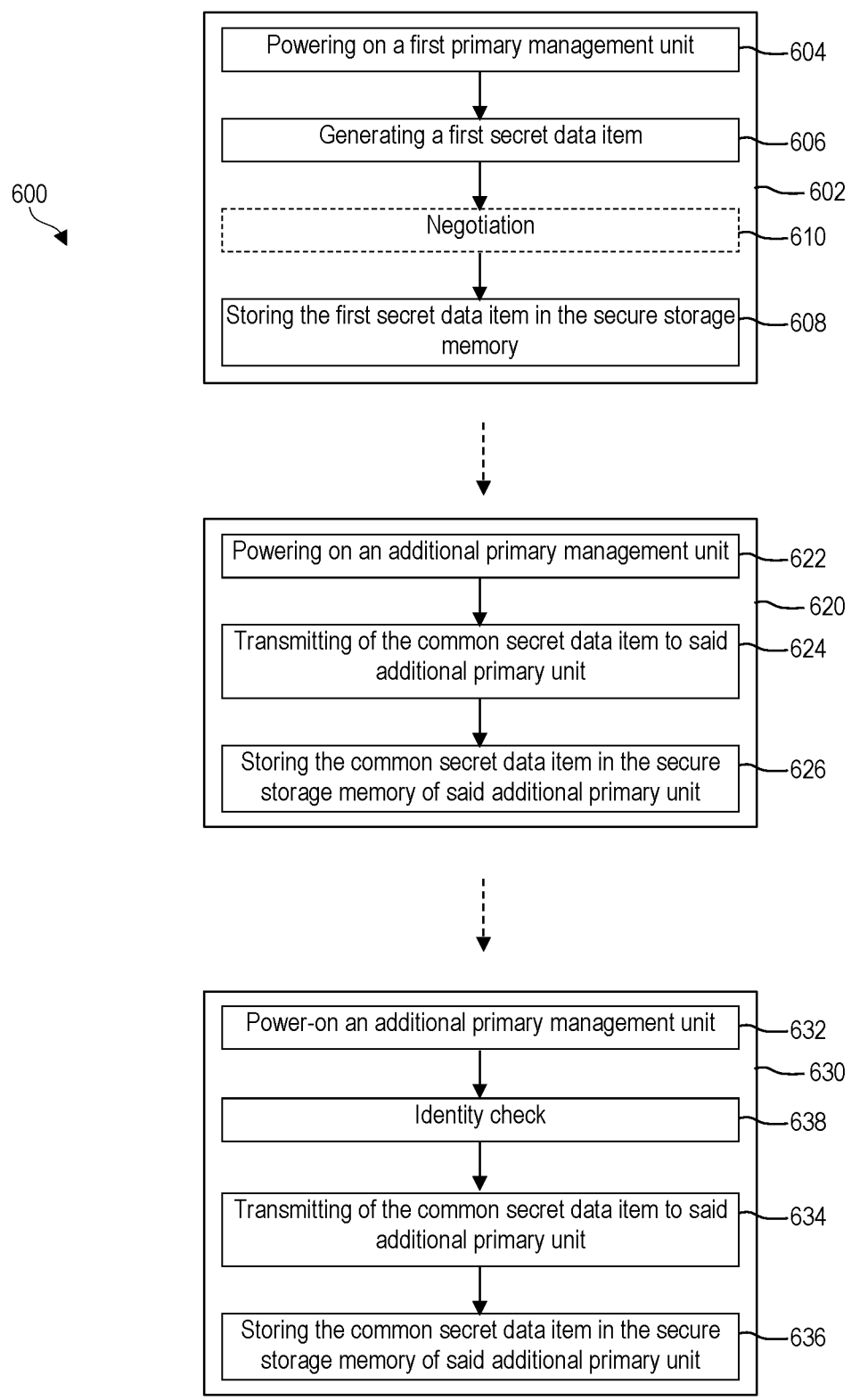
FIG. 6 is a diagrammatic representation of a non-limitative example of a method for managing a HPC machine according to one or more embodiments of the invention.

FIG. 6 is a diagrammatic representation of a non-limitative example of a method according to one or more embodiments of the invention.

The method 600, shown in FIG. 6, may be carried by a HPC machine according to one or more embodiments of the invention and especially be the HPC machines 300, 400 or 500 of FIGS. 3-5.

The method 600 according to one or more embodiments of the invention comprises a phase 602, called a powering on phase, carried out when the HPC machine is powered on. The powering on phase 62 comprises a step 604 powering on a first primary management unit. The powering on of a first primary management unit may be carried out by powering on:

a first CP $304_i$ in the HPC machine 300 of FIG. 3,
a first BMC $404_j$ of a first blade $402_j$ in the HPC machine 400 of FIG. 4, or
a first RMC $504_1$ of a first rack $502_1$ in the HPC machine.

The powering on may be carried out manually or by central device 302, or another device local or distant to HPC device.

At a step 606, a first secret data item is generated by the first powered on primary management unit, i.e. the one powered on at the step 604.

The secret data item is stored, at step 608, in the secure storage memory of the primary management unit. It will be shared to any primary management unit, when applicable to any secondary management unit, that will be powered on thereafter, optionally after verification of the identity of the component integrating said management unit.

In some cases, in at least one embodiment, at the powering on phase 600, several primary management units are powered on at the same time. In this case, the secret data generating step 606 is carried out by each of said primary management units, such that each primary management unit generates a secret data item.

Then, before the storing step 608, the powering-on phase comprises a step 610 during which the powered-on primary management units negotiate together for choosing a common secret data item to be used thereafter in the HPC machine. The negotiation may be carried out according to a predetermined protocol.

The negotiating protocol may lead to choose one of the generated secret data items, as the common secret data item, for example based on a timestamp information or any other predetermined rule. In one or more embodiments, the negotiating protocol may lead to calculate the common secret data item as a function of all of the secret data items generated at step 606.

Regardless the negotiating solution, optionally, the common secret data item obtained at the negotiating step may be stored in a first block of a blockchain, in particular with a timestamp. The secret data item generated by each of the primary management unit may also be added in a new block in said blockchain.

After the power-on phase, the method 600 may comprise a phase 620 powering on an additional primary management unit, according to one or more embodiments.

The phase 620 comprises a step 622 powering on the additional primary management unit, for example by powering on:

an additional CP $304_i$ in the HPC machine 300 of FIG. 3,
an additional BMC $404_j$ in the HPC machine 400 of FIG. 4, or
an additional RMC $504_1$ in the HPC machine.

The powering on may be carried out manually or by central device 302, or another device local or distant to the HPC device.

At a step 624, in at least one embodiment, the common secret data item is communicated to said additional primary management unit, optionally after verification of its identity, or the identity of the component comprising said additional primary management unit.

The common secret data item is stored in the secure storage memory of said additional primary management unit, at step 626.

Optionally, in at least one embodiment, the additional primary management unit may also generate a secret data item that is timestamped and added to the blockchain in a new block.

The phase 620 may be repeated every time an additional primary management unit is powered on in the HPC machine.

The method 600, by way of one or more embodiments, may comprise a phase 630 powering on a new primary management unit, when a new component, such as a CP or a BMC or a RMC, is added to the HPC. Such a component may be an extension component, or a replacement component in case of maintenance for example.

The phase 630 comprises a step 632 powering on the new primary management unit, for example by powering on:

a new CP 304 added to the HPC machine 300 of FIG. 3,
a new BMC 404, or a new blade 402, added to the HPC machine 400 of FIG. 4, or
a new RMC $504_1$, or a new rack $502_j$, added to the HPC machine.

The powering on may be carried out manually or by the central device 302, or another device local or distant to the HPC device.

After the powering on step 632, at a step 638, the identity of the new component is checked. The identity of the new component may be checked as described above, thanks to the identity data stored in an OTP memory of the new primary management unit.

If the identity check is satisfactory, the common secret data item is communicated to said new primary management unit, at step 634.

The common secret data item is stored in the secure storage memory of said new primary management unit, at step 636.

Optionally, in at least one embodiment, the new primary management unit may also generate a secret data item that is timestamped and added to the blockchain in a new block.

The phase 630 may be repeated every time a new component comprising a primary management unit is added to the HPC machine.

Of course, one or more embodiments of the invention are not limited to the examples detailed above.

What is claimed is:

1. A High Performance Computing (HPC) machine comprising:
    several computing processors interconnected through at least one network, and at least one primary management unit, in a vicinity of at least one computing processor of said several computing processors, that is configured to power on said at least one computing processor;
    wherein the at least one primary management unit comprises
        a random data item generator,
        a secure storage memory, for storing a secret data item, common to all computing processors of said at least one computing processor of said HPC machine, and used for authentication of each computing processor of said at least one computing processor of said HPC machine for data exchange in said HPC machine, and,
        a memory configured to store an identity data item that is utilized to check and identify a component at a time when said component is added to said HPC machine.

2. The HPC machine according to claim 1, wherein the secret data item is a random number, the random data item generator comprising a random number generator as a function of at least one physical quantity measured by at least one sensor.

3. The HPC machine according to claim 1, wherein said at least one primary management unit comprises a primary management unit dedicated to a single computing processor of said at least one computing processor.

4. The HPC machine according to claim 1, wherein said at least one primary management unit comprises a primary management unit common to said several computing processors.

5. The HPC machine according to claim 1, wherein said at least one primary management unit comprises a primary management unit common to several groups of computing processors of said at least one computing processor, wherein at least one group of said several groups of computing processors comprises said several computing processors.

6. The HPC machine according to claim 5, further comprising, for said at least one group of the several groups of computing processors, a secondary management unit in a vicinity of said at least one group provided for powering on said at least one computing processor of said at least one group, wherein said secondary management unit comprises a second secure storage memory for storing the secret data item.

7. The HPC machine according to claim 1, further comprising a secondary management unit, wherein for each primary management unit of said at least one primary management unit and for said secondary management unit, the secure storage memory is a RAM memory that is erased when said each primary management unit and said secondary management unit are powered off.

8. The HPC machine according to claim 1, further comprising a secondary management unit, wherein each primary management unit of said at least one primary management unit and said secondary management unit further comprises a trusted execution environment (TEE) that executes a trusted client controlling access to the secure storage memory of said each primary management unit and said secondary management unit.

9. The HPC machine according to claim 1, further comprising a secondary management unit, wherein each primary management unit of said at least one primary management unit or said secondary management unit or both said at least one primary management unit and said secondary management unit further comprises said memory comprising a one-time programmable (OTP) memory that stores said identity data item and that is utilized to check and attest said identity of said component comprising said at least one primary management unit or said secondary management unit or both said at least one primary management unit and said secondary management unit, at said time that said component is added to said HPC machine.

10. The HPC machine according to claim 1, further comprising several computing racks, each computing rack of said several computing racks comprising several computing blades, each computing blade of said several computing blades comprising said several computing processors, wherein
    for at least one computing rack of said several computing racks, a primary management unit of said at least one primary management unit is integrated in a Rack Management Controller (RMC) of said at least one computing rack in a processor of said RMC; and
    for at least one computing blade of said several computing blades, a secondary management unit is integrated in a Baseboard Management Controller (BMC) of said at least one computing blade in a processor of said BMC.

11. A management method for a High Performance Computing (HPC) machine, said HPC machine comprising
    several computing processors interconnected through at least one network, and
    at least one primary management unit, in a vicinity of at least one computing processor of said several computing processors, that is configured to power on said at least one computing processor;
    wherein the at least one primary management unit comprises a random data item generator,
    a secure storage memory, for storing a secret data item, common to all computing processors of said at least one computing processor of said HPC machine, and used for authentication of each computing processor of said at least one computing processor of said HPC machine for data exchange in said HPC machine, and,
    a memory configured to store an identity data item that is utilized to check and identify a component at a time when said component is added to said HPC machine;
    said management method comprising:
    a phase for powering on said HPC machine, said phase for powering on said HPC machine comprising
        powering on a first primary management unit of said at least one primary management unit,
        generating, by said first primary management unit, the secret data item, and storing said secret data item in the secure storage memory.

12. The management method according to claim 11, wherein, when several primary management units of said at least one primary management unit are powered-on at a same time, said phase for powering on said HPC machine further comprises
generating, by each primary management unit of said several primary management units, the secret data item,
negotiating between said several primary management units of a common secret data item, according to a predetermined negotiation protocol, and
storing said common secret data item in the secure storage memory of said each primary management unit.

13. A communication method in a High Performance Computing (HPC) machine, said HPC machine comprising
several computing processors interconnected through at least one network, and
at least one primary management unit, in a vicinity of at least one computing processor of said several computing processors, that is configured to power on said at least one computing processor;
wherein the at least one primary management unit comprises a random data item generator,
a secure storage memory, for storing a secret data item, common to all computing processors of said at least one computing processor of said HPC machine, and used for authentication of each computing processor of said at least one computing processor of said HPC machine for data exchange in said HPC machine, and,
a memory configured to store an identity data item that is utilized to check and identify a component at a time when said component is added to said HPC machine;
said communication method comprising:
sending data to, or receiving data from, said at least one computing processor according to a key agreement protocol using the secret data item stored in the secure storage memory of the at least one primary management unit associated to said at least one computing processor.

14. The HPC machine according to claim 1, wherein said authentication of said each computing processor of said at least one computing processor comprises verification of an identity of said each computing processor to prove that said each computing processor is a component of the HPC machine or a trusted component.

15. The management method according to claim 11, wherein said authentication of said each computing processor of said at least one computing processor comprises verification of an identity of said each computing processor to prove that said each computing processor is a component of the HPC machine or a trusted component.

16. The communication method according to claim 13, wherein said authentication of said each computing processor of said at least one computing processor comprises verification of an identity of said each computing processor to prove that said each computing processor is a component of the HPC machine or a trusted component.

* * * * *